United States Patent [19]

Evans

[11] Patent Number: 5,038,923

[45] Date of Patent: Aug. 13, 1991

[54] MINI-ROLLER CONVEYOR WITH VARIABLE PRESSURE TRACTION SLEEVE

[75] Inventor: Donald E. Evans, Hilliard, Ohio

[73] Assignee: Don Evans & Associates, Inc., Hilliard, Ohio

[21] Appl. No.: 380,990

[22] Filed: Jul. 17, 1989

[51] Int. Cl.5 ............................................. B65G 13/06
[52] U.S. Cl. .................................... 198/781; 198/790
[58] Field of Search ................ 198/781, 782, 789, 790

[56] References Cited

U.S. PATENT DOCUMENTS

| 151,253 | 5/1874 | Tothammer et al. | 198/790 |
|---|---|---|---|
| 3,610,406 | 10/1971 | Fleischauer et al. | 198/781 X |
| 3,831,733 | 8/1974 | Howard et al. | 198/790 X |
| 3,980,172 | 9/1976 | Degood | 198/781 |
| 4,006,815 | 2/1977 | Werntz | 198/781 |
| 4,006,816 | 2/1977 | Werntz | 198/781 |
| 4,266,659 | 5/1981 | Meyer et al. | 198/781 |
| 4,266,660 | 5/1981 | Herman | 198/781 |
| 4,284,186 | 8/1981 | Brouwer | 198/790 X |
| 4,313,536 | 2/1982 | Fauth | 198/781 |
| 4,314,629 | 2/1982 | Shilander et al. | 198/781 X |
| 4,343,395 | 8/1982 | Lippert et al. | 198/781 |
| 4,343,395 | 8/1982 | Lippert et al. | 198/781 |
| 4,366,899 | 1/1983 | Doro | 198/781 |
| 4,421,224 | 12/1983 | Dingman | 198/781 |
| 4,508,212 | 4/1985 | Bolle et al. | 198/781 |
| 4,524,861 | 6/1985 | Matsushita | 198/781 |
| 4,798,282 | 1/1989 | Sperduti et al. | 198/781 |

FOREIGN PATENT DOCUMENTS 1368085 9/1974 United Kingdom ................ 198/781

Primary Examiner—D. Glenn Dayoan
Attorney, Agent, or Firm—Litman, McMahon & Brown

[57] ABSTRACT

Mini-roller shafts are provided at opposite ends with resilient traction sleeves and with oversized transport sleeves therebetween. Bearing members are provided to position the traction sleeves for frictional engagement with endless drive members extending along opposite sides of the conveyor module. Each bearing member is provided with a relatively enlarged roller shaft-receiving opening that permits limited radial movement of the shaft, and some of the bearing members include a transport sleeve-receiving cradle. Accordingly the roller shaft is able to be deflected or displaced when the concentration or weight of the articles being conveyed on a given area of the conveyor reaches a point where reduction of pressure between the articles is desirable.

15 Claims, 6 Drawing Sheets

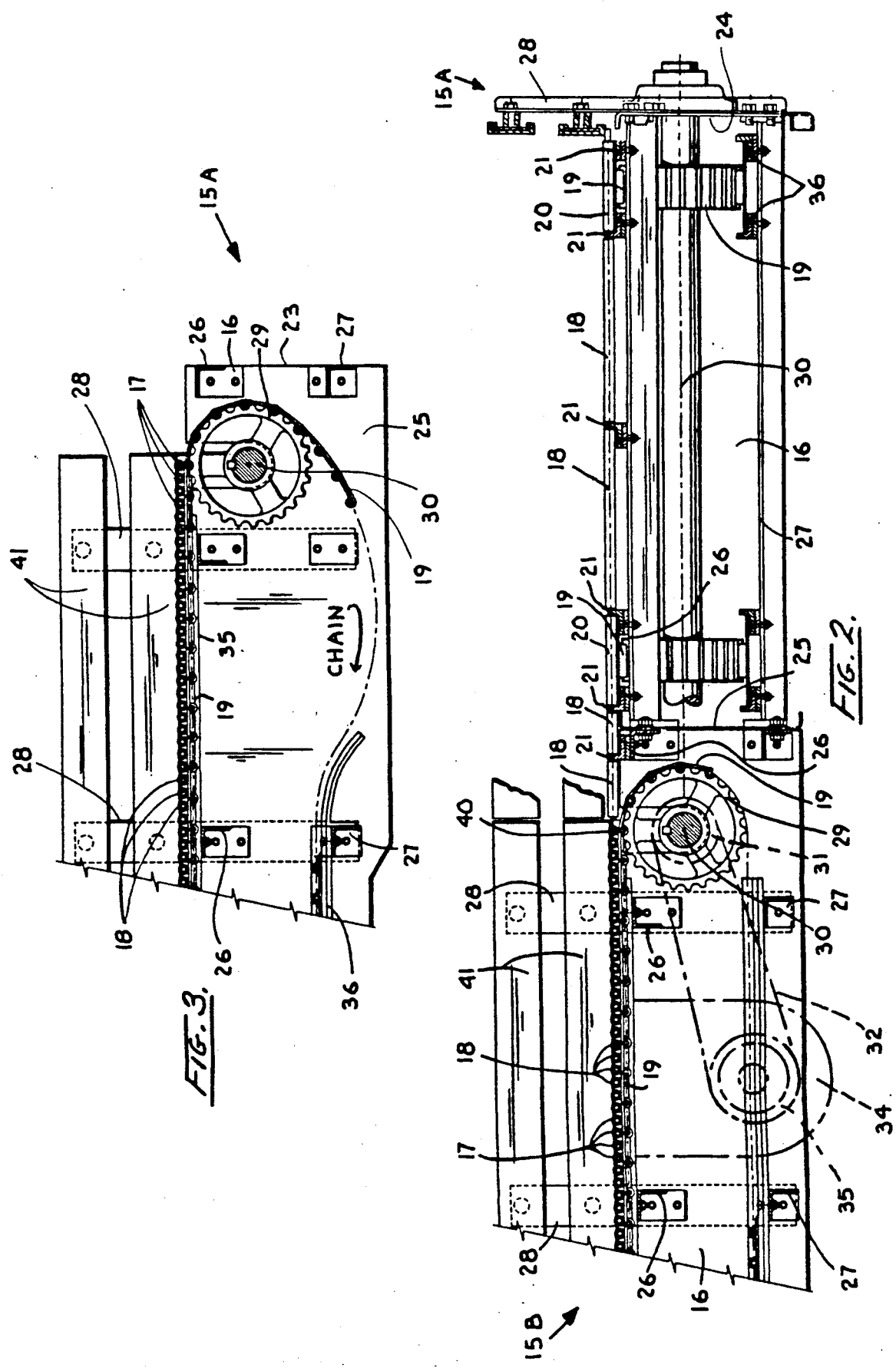

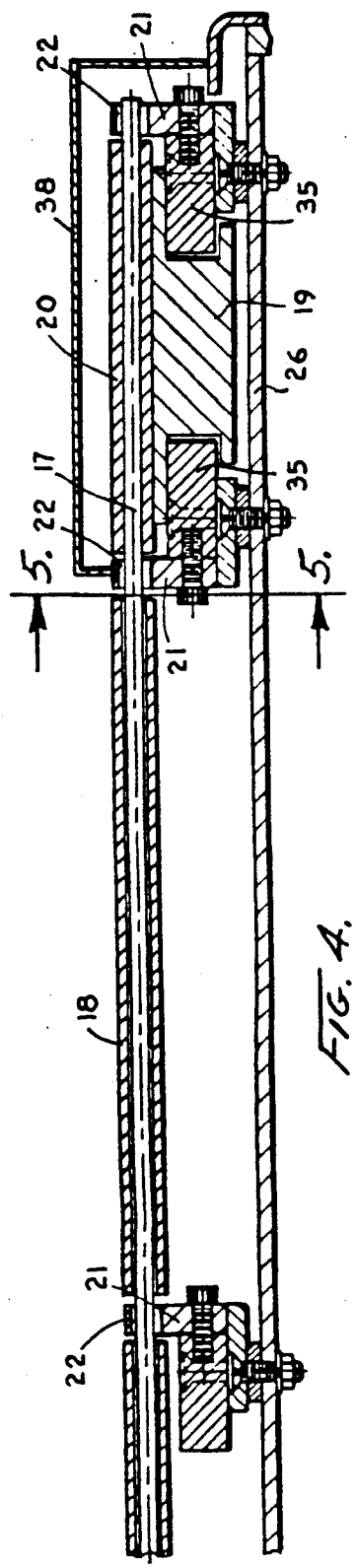
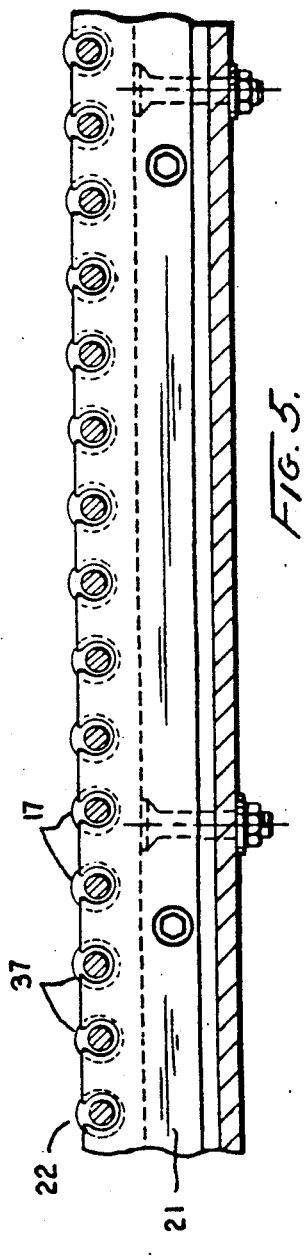
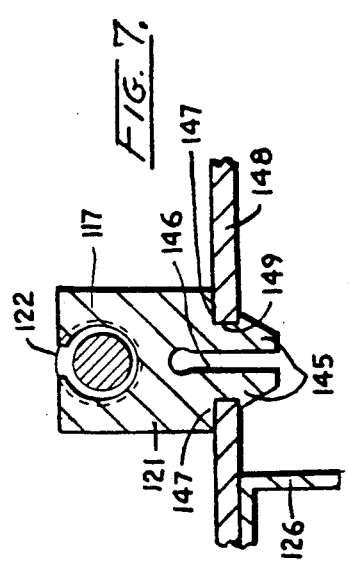

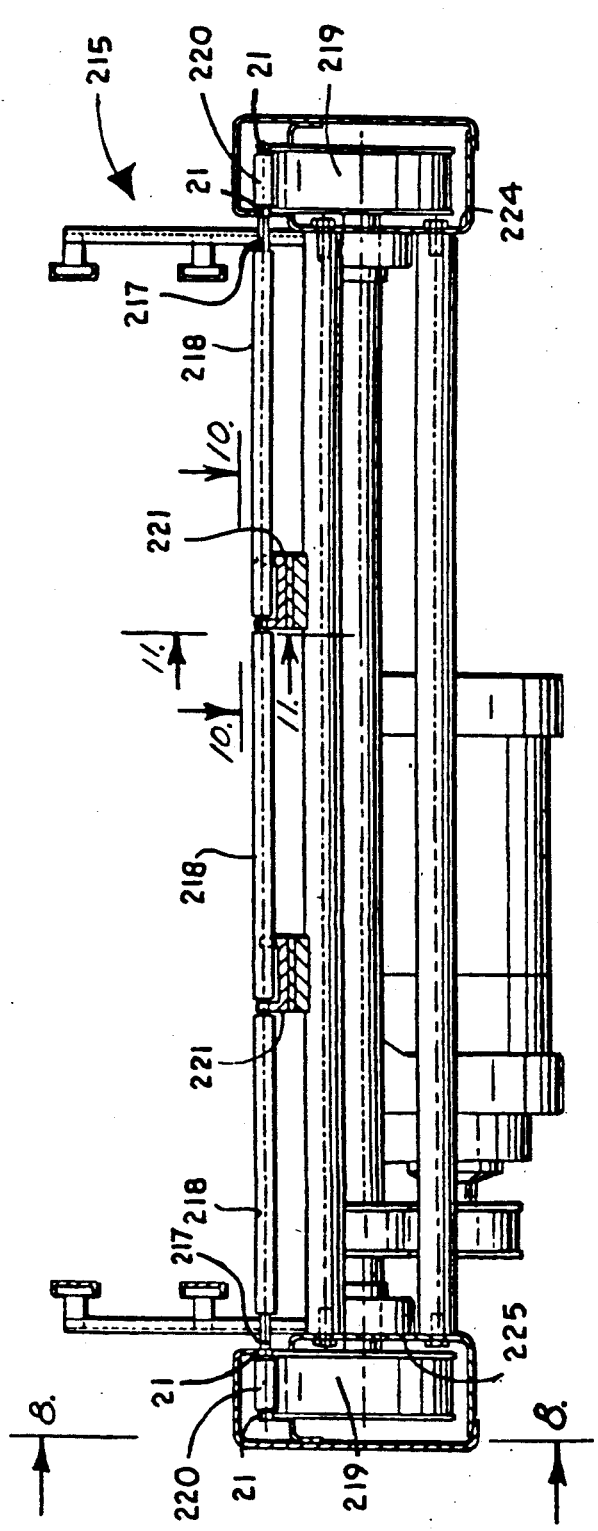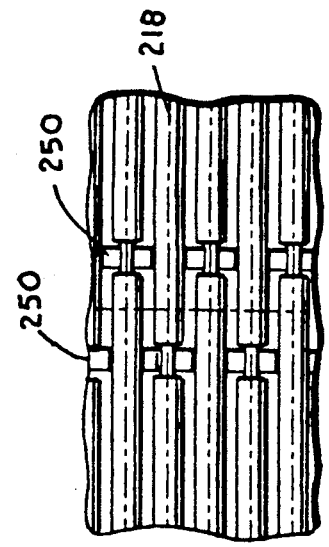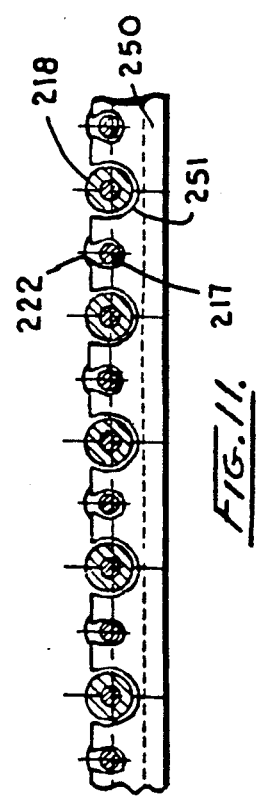

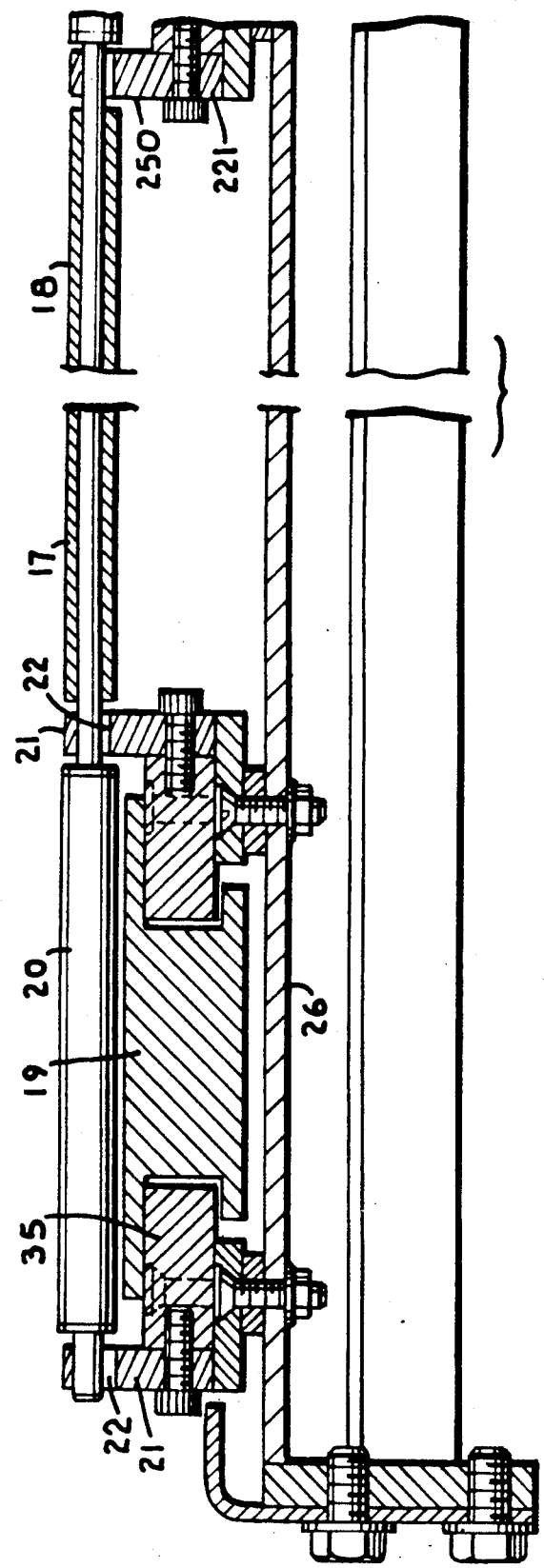

MINI-ROLLER CONVEYOR WITH VARIABLE PRESSURE TRACTION SLEEVE

BACKGROUND OF THE INVENTION

The present invention relates to conveyors equipped with article-conveying driven rollers, and more particularly to those equipped with means for altering the amount of thrust exerted on the articles being conveyed.

In those areas of a production line where the need to control the movement of articles is greatest, conveyors equipped with driven rollers are frequently preferred over those equipped with article-engaging endless belts. Such driven rollers are relatively closely spaced, small diameter assemblies and are often found in canning, bottling, pharmaceutical and electronic assembly plants. Typically, these so-called mini-roller conveyors are modular and may be arranged in a wide variety of configurations so that the direction of travel of the articles can be altered relatively easily.

At various stages in the production line, the products or product containers accumulate on the conveying apparatus. For instance, where one automated process takes longer to perform than the previous upstream operation, the containers and/or goods accumulate on the conveyor at or near the slower downstream operation. Such accumulations may also occur within the conveyor assembly where the direction of travel changes or where the articles must be channelled through narrower passages. The resulting congestion creates pressure against the walls of the containers, such as cans or bottles, as the upstream items are forced against those moving at a slower rate or not at all. Such pressure tends to damage the articles and increase the wear and tear on the conveying apparatus. While the initial vector of this force is substantially coplanar with the would-be direction of travel of the articles, it builds and spreads quickly, creating excessive friction and drag in the moving conveyor parts as the number of articles accumulating in a given area increases.

Such accumulation pressure may be reduced in a number of ways. For instance, the articles may be diverted to an accumulation table and then shifted on demand to the downstream equipment. Alternatively, additional units of processing equipment may be provided, and the articles conveyed in separate streams to the duplicate machinery. Accumulation pressures may also be lowered by regulating the speed and time it takes them to reach the downstream machinery. However, in each case, substantial additional manufacturing costs are incurred.

Another response has been to limit the ability of the rollers to grip the undersurface of the articles being conveyed. This reduction in friction or surface contact permits the articles and rollers to slip relative to one another when an accumulation of items overloads the system. One means of providing this slippage may include providing the roller surfaces with material having a relatively low coefficient of friction, such as lubricants, and/or by forming the rollers from relatively hard and smooth materials such as stainless steel. Another method may be to limit the amount of surface contact between the rollers and the articles being conveyed, such as by employing containers whose undersurface is concave or otherwise varied.

Another method of providing this slipping effect has been to provide one or more oversized transport sleeves on each roller shaft, wherein the inner diameter of the sleeve is greater than the outer diameter of the shaft. In this manner, the shafts continue to rotate when congestion limits the movement of the articles being conveyed, while the oversized sleeves in contact with the congested articles remain relatively stationary.

Another, and closely related, problem with conventional mini-roller conveyors has involved the means of transferring power from an electrically actuated drive motor to the roller shafts. In one instance, each of a plurality of roller shafts was connected to a planetary gear transmission by means of a flexible drive shaft. See, U.S. Pat. No. 4,313,536. A clutch mechanism was provided between each of the transmissions and the drive motor so that in certain conditions, such as heavy congestion, power would not reach the transmission. This clutch mechanism added to the already complex mechanical structure. In addition, the torque applied to the roller shafts was limited to that which could be applied at one end thereof.

In another instance, an elastomeric belt was provided between each transversely disposed roller shaft and an underlying, longitudinally extending drive shaft. While mechanically relatively simple, the downwardly extending belts pulled the roller shafts in that direction, thereby augmenting the wear on the roller shaft bearings already subject to the weight of the conveyed articles.

In addition to the above mentioned drive systems, conveyors equipped with article-engaging rollers have also been driven by endless belts. Such conveyors, however, were used in moving large boxes and pallets of goods and were provided with relatively large diameter rollers. Elaborate mechanisms were provided to regulate overload conditions, accompanied by relatively high cost and various maintenance problems.

Thus, the present inventor was faced with several problems which have plagued mini-roller conveyors in the past. First, there were the problems of devising a conveyor that was relatively simple mechanically and adaptable to a wide variety of shapes and sizes. Second, the problem of handling overload conditions without damaging the goods or the internal mechanisms of the conveyor also needed a solution. Third, there was the problem of devising a mini-roller conveyor to sufficiently close tolerances that the cans, bottles or other articles intended to be conveyed thereon would have a smooth, even surface upon which to travel.

SUMMARY AND OBJECTIVES OF THE INVENTION

The present invention represents an improvement in a conveyor module which includes a support structure, a plurality of elongated roller shafts extending across the support structure in closely spaced, side-by-side relation to one another and at least one oversized sleeve mounted on each roller shaft. The subject improvement comprises: (a) at least one endless drive member movably mounted on the support structure below the roller shafts; (b) a traction sleeve disposed on each of the roller shafts for frictional engagement with the endless drive member; and (c) a plurality of bearing members mounted on the support structure and each formed with at least one roller shaft-receiving opening, said opening being enlarged in at least one radially extending direction to permit a segment of the roller shaft rotatably housed therein to move off center.

One object of the present invention is to provide a mini-roller conveyor with means for reducing the amount of thrust imparted by the conveyor in those areas where the articles being conveyed have accumulated. Another object of the present invention is to permit a wide variety of conveyor configurations. Yet another object of the present invention is to reduce the amount of wear on the moving conveyor parts in those areas where product accumulation occurs. A further object is to provide a conveyor deck that can be retrofitted onto preexisting conveyor systems. Still another object is to provide high volume, low pressure transport and accumulation of articles which are difficult to convey due to product geometry or fragility. These and other objects and advantages of the present invention may be more readily apparent in view of the following drawings and detailed discussion of the preferred embodiments.

BRIEF DESCRIPTION OF THE DRAWINGS

FIG. 2 is an enlarged vertical sectional view taken along line 2—2 of FIG. 1 and particularly illustrates the relative arrangement of the endless drive members, rollers, sleeves and support structure of the present invention;

FIG. 3 is an enlarged fragmentary vertical sectional view taken along line 3—3 of FIG. 1 and particularly illustrates a return path of the flexible drive chain;

FIG. 4 is a further enlarged fragmentary vertical sectional view taken along line 4—4 of FIG. 1 and particularly illustrates an oversized sleeve and a traction sleeve mounted on a roller shaft of the present conveyor;

FIG. 5 is a vertical sectional view taken along line 5—5 of FIG. 4 and particularly illustrates one embodiment of the bearing member of the present invention;

FIG. 7 is an enlarged vertical sectional view taken along line 7—7 of FIG. 6 and particularly illustrates an alternative embodiment of the present bearing member;

FIG. 9 is a vertical sectional view taken along line 9—9 of FIG. 8 and particularly illustrates the manner, in which the alternative embodiment of the endless drive member is mounted on the present conveyor;

FIG. 10 is a fragmentary top plan view taken along line 10—10 of FIG. 9 and particularly illustrates an additional alternative embodiment of the present bearing member and staggered sleeve pattern;

FIG. 11 is an enlarged fragmentary vertical sectional view taken along line 11—11 of FIG. 9 and further illustrates the additional alternative embodiment of the present bearing member; and FIG. 12 is an enlarged, fragmentary vertical sectional view and particularly illustrates the accumulated load state of the present conveyor module.

DETAILED DESCRIPTION OF THE PREFERRED EMBODIMENT

Figure 1:
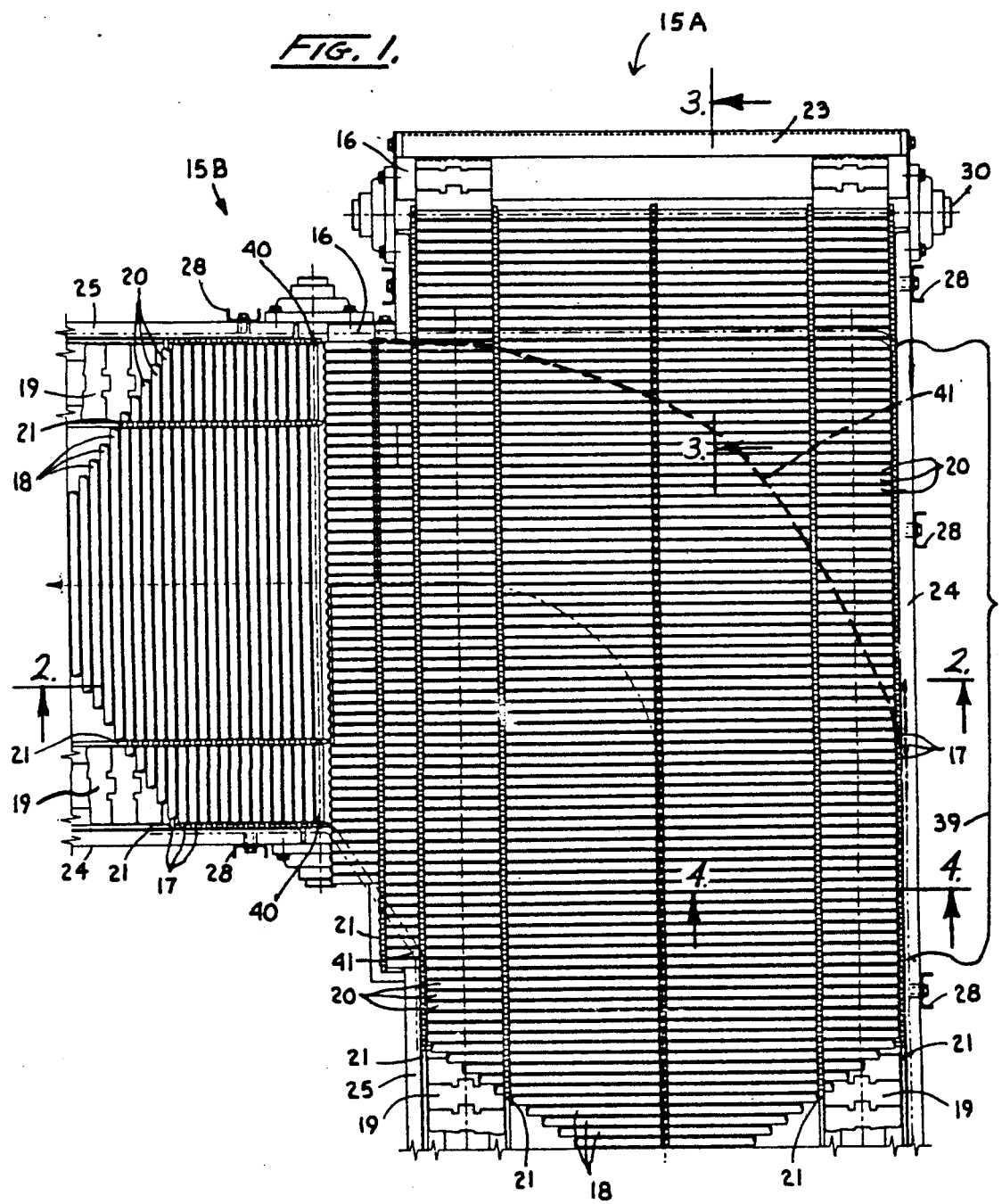
FIG. 1 is a top plan view of two conveyor modules according to the present invention disposed at a right angle to one another.

As indicated in FIGS. 1-3, each of the mini-roller conveyor modules, generally designated 15(A) and 15(B) according to the present invention, basically comprises a support structure 16, a plurality of elongated mini-rollers 17 extending across the support structure in closely spaced, side-by-side relation to one another, an elongated oversized transport sleeve 18 mounted on each roller 17, a pair of laterally spaced apart endless drive members 19 movably mounted on opposite sides of the support structure 16 below the rollers 17, a pair of laterally spaced apart traction sleeves 20 disposed on each of the rollers 17 for frictional engagement with the endless drive members 19, and a plurality of bearing members 21, each mounted on the support structure 16 and formed with a plurality of roller shaft-receiving, enlarged openings 22 (FIG. 5) in each of which a segment of one of the rollers 17 is rotatably housed.

The support frame 16 typically includes a vertically disposed plate 23 on at least one end of the conveyor module, a pair of relatively spaced apart, vertically disposed side walls 24 and 25 extending from one end of the module to the other, and a plurality of relatively spaced apart, upper 26 and lower 27 transverse mounting beams extending between the side walls 24, 25. In addition, guide rail supports 28 may extend upwardly from one or both side walls. Preferably, the above-mentioned support structure members are formed from steel and include suitable floor-mounted legs or pedestals (not shown).

As further indicated in FIGS. 1-3 the endless drive members 19 may be formed from relatively wide, pivotally interconnected links such as the table-top chain manufactured by Rexnord. The subject drive chains 19 present relatively wide and flat upper surfaces along the upper portion of their travel. Each of the drive chains 19 is engaged by a guide sprocket 29 rotatably mounted inwardly of at least one end plate 23 on a journaled shaft 30. As indicated in FIG. 2, the shaft 30 at the rear end of the support structure is provided with a drive sprocket 31 which is operatively connected by a roller chain 32 to a sprocket 33 extending from an electrically actuated motor 34. Depending upon the characteristics of the load, a single motor 34 may power both drive chains 19, or separate motors may be provided.

As best indicated in FIG. 4, an upper pair of wear strips or chain guides 35 preferably formed from a synthetic resin material having a relatively low coefficient of friction, such as high density polyethylene, are mounted on the upper beams 27 on opposite sides of each drive chain 19 and extend generally the entire length of the conveyor module. A lower pair of guides 36 (FIGS. 2 and 3) for each drive chain 19 are mounted on the lower beams 26 to control the movement of the chains along their lower return course of travel. As may be readily understood, the chain guides 35, 36 may be shaped and positioned in a variety of ways to accommodate drive chains 19 of differing construction. Preferably, the upper guides 35 are mounted upon the upper beams 26 adjacent to or in cooperation with the bearing members 21 (FIG. 4).

As indicated in FIGS. 1 and 5, the bearing members 21 extend substantially the length of the conveyor module in laterally spaced fashion to one another. Each bearing member is preferably formed from synthetic resin anti-friction material, such as ultra high molecular weight polyethylene. The bearing strips 21 disposed on opposite sides of the traction sleeves 20 may be integrally formed with or fastened to the upper chain guides 35 in a generally L-shaped configuration. Depending upon the load requirements and width of the conveyor, the number of laterally spaced apart bearing strips 21 may be varied. The subject bearing members are disposed at opposite ends of each roller 17 and between the oversized transport sleeves 18 and traction sleeves 20. The walls of each bearing member 21 adjacent to each of the openings 22 formed therein define a relatively restricted neck 37 (FIG. 5) which is slightly smaller than the diameter of the roller 17. In this manner, the shaft 17 may be snap-fitted into the bearing opening 22. Since the opening is enlarged relative to the shaft, the shaft is free to rotate and move off center. For example and not by way of limitation, the shaft may shift by approximately 5/64 inch, in any radial direction therein. The bearing openings 22, drive chains 19, and traction sleeves 20 are sized and positioned so that, under normal load conditions, the weight of the articles being conveyed is carried by the drive chains and associated support components, rather than by the bearing members.

As indicated in FIG. 4, the traction sleeves 20 are sized and mounted on each roller 17 so that the outer surface of each traction member engages the upper surface of one of the drive chains 19. The inner diameter of each traction sleeve 20 is slightly less than the outer diameter of the roller shaft 17 so that a relatively tight, nonrotating fit is established therebetween. Preferably, the traction sleeve 20 is formed from relatively flexible, low durometer synthetic resin material such as urethane, to reduce noise, absorb vibration and provide a suitable coefficient of friction.

The oversized sleeves 18 are formed with an inner diameter which is slightly greater than the outer diameter of the roller shafts 17. In this manner, the roller shaft is able to impart rotary movement to the sleeve 18 under ordinary load conditions; however, when congestion brings the articles being conveyed to a standstill, the rollers may rotate relatively freely within the sleeves that are directly below the goods whose progress has been halted. Preferably, the oversized sleeves 18 are formed from relatively rigid synthetic resin material such as PVC. For example, and not by way of limitation, the outer diameter of the roller shaft 17 may be 9/32 inch, the inner diameter of the traction sleeve ¼ inch, and the inner diameter of the oversized sleeve ⅜ inch. The number of oversized sleeves 18 disposed on each roller depends upon the number of bearing strips 21 upon which the roller is mounted.

A cover 38 (FIG. 4) may extend over the traction sleeve 20 to prevent the items being conveyed from migrating outwardly from the oversized rollers 18 and to keep the traction drive area clean.

The weight of the items being conveyed, as well as the weight of the sleeve itself in an unloaded state, urges the sleeves 18 downwardly into engagement with the roller shafts 17 disposed therein. This contact causes the sleeves 18 to rotate, albeit with some slippage, under the impetus of the rotating roller shaft in both no-load and normal-load states, and thereby moves the items along the conveyor. If and when congestion builds to the point that a reduction in accumulation pressure is desirable, the weight of the containers on the sleeve 18 forces the roller shaft 17 downwardly in the enlarged openings 22 in the bearing members 21 closest to the midline of the conveyor. Concurrently, the outwardly disposed portions of the roller shafts 17 curve upwardly. As the outer, traction sleeve-bearing ends of the roller shafts 17 rise, the contact surface area between the traction sleeves 20 and the drive chains 19 decreases. Consequently, the amount of torque which the drive chain 19 is capable of exerting on the traction sleeve is reduced.

Furthermore, as the items being conveyed accumulate more and more, they tend to slow or stop on the conveyer, thereby urging the transport sleeves to slow or stop rotating. When the disparity between the rotational velocities of the transport sleeve and shaft housed therein reaches a certain point, the shaft 17 tends to bow in a generally horizontal, upstream direction, by virtue of the play provided in the bearing openings 22. The off center movement of the roller shaft in the bearing member 21 reduces the torque exerted by the shaft on the transport sleeve 18, thereby diminishing the thrust exerted on the conveyed items as described in further detail below. In effect, a variable overload clutch is provided which reduces accumulation pressure and prevents excessive wear on the roller shafts 17, oversized sleeves 18, traction sleeves 20 and bearing members 21.

The length of the traction sleeve 20, the amount of pressure between the sleeve and the chain, and the coefficient of friction of the traction sleeve and the drive chain surface determine the amount of torque that can be applied to the roller shafts 17. The greater the accumulation of product, the more the roller shaft tends to bow in the middle, thereby reducing the pressure between traction sleeve 20 and drive chain 19. However, the ability of the roller shaft to bow in the middle is limited by the bearing members 22. At a certain point after the conveyor reaches an overload condition, the roller shaft bottoms out in the bearing member. The greater the accumulation pressure, the more drag which is transmitted from the transport sleeves 18 and shafts 17 to the traction sleeve 20. This increased drag, as well as the reduced pressure between traction sleeve 20 and drive chain 19 cause the sleeve to slip, rather than rotate, on the chain. This tendency to slip may be increased by shortening the length of the traction sleeve 20 and/or by changing the composition of the outer sleeve or chain surfaces to reduce the coefficient of friction between the two. However, in order to provide sufficient recovery drive to move the downstream end of the accumulated products once some space is established into which they can move, some contact between the traction sleeve and drive chain is always provided so that at least minimal rotation of the roller shaft 17 is maintained. Again, the bearing members 22 limit the off center movement of the roller shaft so that some contact between the traction sleeve and drive chain is maintained.

As indicated in several of the drawings, the above-described features permit the present conveyor module to provide a variety of configurations and variations in the direction of product flow. As indicated in FIGS. 1 and 2, two of the subject conveyor modules (15A, 15B) may be disposed at right angles to one another to provide a 90° turn in the direction of flow of the items being conveyed. In this case, the delivering conveyor 15A includes an extra long set of rollers 39 which are juxtaposed with the receiving conveyor 15B and provided with additional support beams 26, oversized sleeves 18 and bearing members 21. As indicated, the free ends of the overhanging sleeves 18 are positioned as close as possible to the adjacent end roller and sleeve assembly 41 on the receiving conveyor 15B without actually touching it. In this manner, the bottles or cans are transferred from the delivering conveyor 15A to the receiving conveyor 15B without becoming caught therebetween. Advantageously, the oversized sleeves mounted on the overhanging transitional portion of the delivering conveyor 15A provide a relatively smooth surface upon which the items may slide in a lateral direction under the impetus of the delivering conveyor 15A, and guide rails 41.

In those instances where goods need to be conveyed in a generally linear fashion over a substantial distance, several of the present straight conveyor modules 15 may be joined together in end-to-end fashion (not shown). In this arrangement, the end plates 23 are omitted from the relatively adjoining ends of the modules, and additional upper 26 and lower 27 transverse support beams are mounted at the ends of the side walls 24, 25 of the relatively adjoining modules and are bolted or otherwise secured together. The bearing members 21 and rollers 17, with their associated oversized transport sleeves 18 and traction sleeves 20, are provided from one end of the multi-module assembly to the other. One or both of the drive chains 19 may be increased in length to extend beyond the end of one conveyor module and a jump sprocket (not shown) may be provided to engage the guide sprocket upon which the belt rotates. The jump sprocket, in turn, powers a second drive belt aligned with the first. Depending upon the sprocketing, the second belt may operate at a different velocity than the first, if desired. In order to avoid having rollers that are not driven in the area where conveyor modules are spliced together, the turning points on the opposing drive chains 19 are preferably staggered. An additional motor 34 may be operatively connected to the guide sprockets 29 on one of the adjoining ends; however, it may also be possible to back drive a straight assembly formed with a plurality of the present conveyor modules with a single motor. In addition, generally U-shaped, vertically disposed splice plates may be bolted or otherwise secured to relatively adjoining side walls of adjacent modules.

Figure 6:
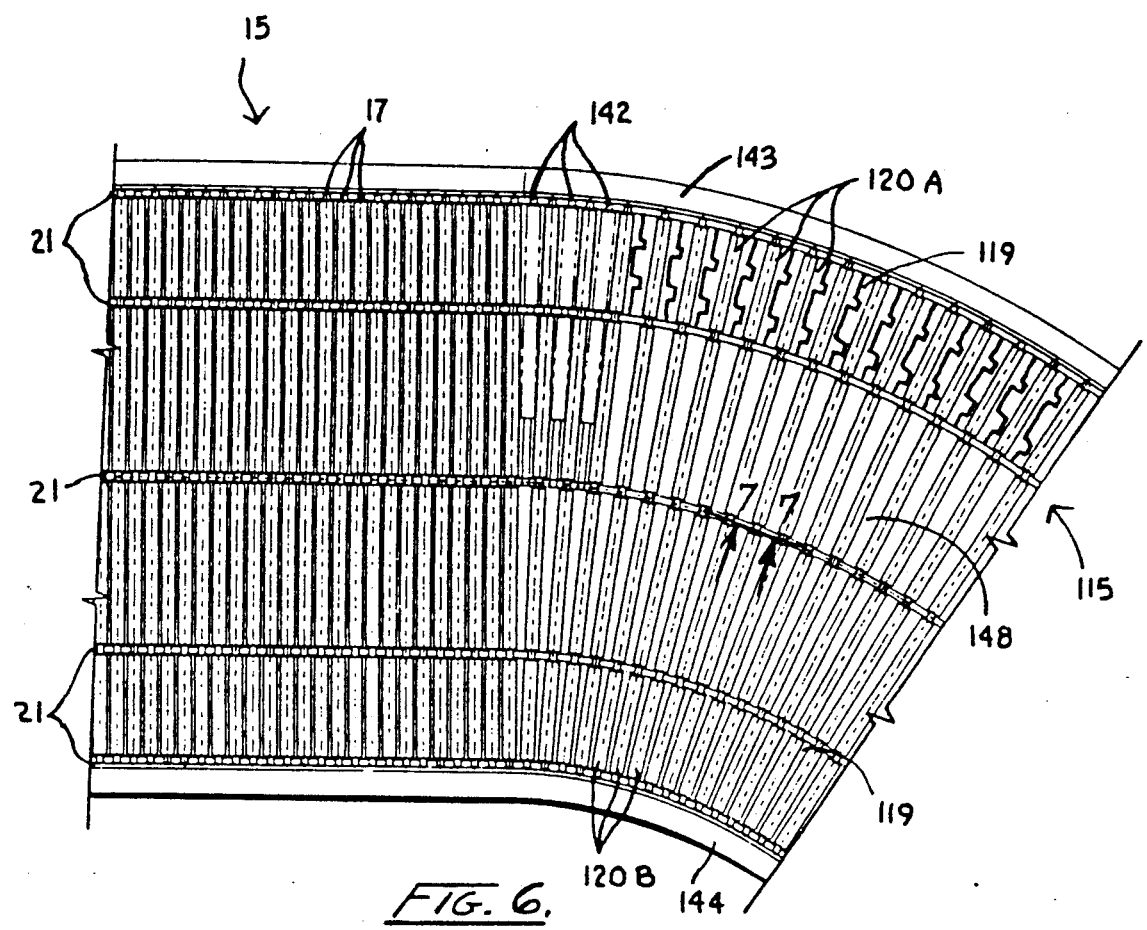
FIG. 6 is a fragmentary top plan view of a curved conveyor module according to the present invention.

As indicated in FIG. 6, the present conveyor module 115 may be curved. Drive chains 119 capable of lateral flexure, such as those manufactured by Rexnord, are well known in the art. In the curved section, the mini-rollers 117 are disposed in a side-by-side radial configuration across the conveyor and are spaced closer together at the smaller radius of the curve than at the larger radius. Relatively shorter intermediate length roller and sleeve assemblies 142 may be provided between the regular length rollers that span the distance between the relatively spaced apart outer side wall 143 and inner side wall 144 of the support structure. In this arrangement, the width of the curved conveyor module 115 remains substantially constant and equal to the width of the straight conveyor modules to which it is attached, so that a restriction in the flow of goods is not created in the assembly. Preferably, the drive chains 119 are continuous from the straight module 15 through the curved modules. In this manner, the intermediate roller assemblies 142, as well as the full length roller assemblies 117 are driven.

The curved conveyor module 115 demonstrates one of the advantages of the present traction sleeves 120A and 120B. The portion of the chain 119 adjacent to the smaller radius sidewall 144 is shorter than the opposing drive chain 119 adjacent to the larger radius side wall 143. However, since the velocities of the drive chains 119 are substantially the same, the angular velocities of the outer 120A and inner 120B traction sleeves should be approximately the same. Since all of the regular length roller assemblies 117 are preferably driven by both chains, the inner 120B and outer 120A traction sleeves do not tend to create drag on one another. However, the pressure between the traction sleeves and the underlying drive chain 119 is variable by virtue of the enlarged shaft-receiving openings 122 (FIG. 5) in the modified bearing member 121 discussed below. Thus, the traction sleeves 120A-B are capable of slipping relative to the drive belts 119, depending upon the density and position of the load. For example, if the goods being conveyed are concentrated towards the outer portion of the curved conveyor, then the traction sleeves 120B at the inner curve 144 are more likely to slip. Conversely, if the goods are concentrated near the inner curve, then the outer traction sleeves 120A are more likely to slip relative to the outer drive belt.

As indicated in FIGS. 6 and 7, a plurality of single roller shaft-supporting bearing members 121 are employed on the curved conveyor module 115, rather than the elongated bearing strips 21 provided on the straight conveyor module 15. Each of the single shaft-supporting bearing members 121 is preferably integrally formed from synthetic resin material such as UHMW polyethylene and is provided with a single, enlarged opening 122 for receiving a segment of one of the roller shafts 117 or 142. In addition, the subject bearing member 121 is formed with a pair of downwardly projecting legs 145 which are separated by a downwardly opening slot 146. A pair of relatively opposing, frame-receiving notches 147 are formed in the legs. The curved conveyor module 115 is provided with an upper bearing-receiving plate 148 mounted on the upper transverse support beams 126 of the support structure. The mounting plate 14B is formed with a plurality of relatively spaced apart leg-receiving socket disposed in relatively spaced apart, curvilinear fashion. Preferably, the curvilinear pattern of the leg-receiving sockets is computer generated in such a manner that the bearing members 121 may be disposed therein to provide proper positioning and support for the roller assembly 117. Advantageously, each of the bearing-receiving sockets 149 is sized so that the bearing legs 145 are flexed inwardly upon insertion therein, with the adjacent edges of the table 148 disposed in the notches 147 in the bearing member 121. In this manner, the bearing member 121 may be snap-fitted into the mounting sockets 149.

A plurality of the single shaft-receiving bearing members 121 may be employed on the straight conveyor module 15, as well as on the curved conveyor module 115. However, as indicated in FIG. 6, the distance between the rollers 117, 142 varies, depending upon the position of the rollers relative to the outer 143 and inner 144 sidewalls of the support structure. In contrast, the spacing between the roller assemblies 17 on the straight conveyor module 15 is relatively constant. Accordingly, if the elongated bearing strips 21 were employed on the curved conveyor module 115, the spacing of the vertically elongated roller-receiving slots in the bearing strips would vary, depending upon the position of the bearing strips relative to the sidewalls 143, 144. By employing the single shaft-receiving bearing members 121, it is not necessary to bend the elongated bearing strips 20 to conform to the curvature of the conveyor module 115, nor to provide bearing strips wherein the spacing between shaft-receiving slots is varied depending upon the position of the strip on the curve.

Figure 8:
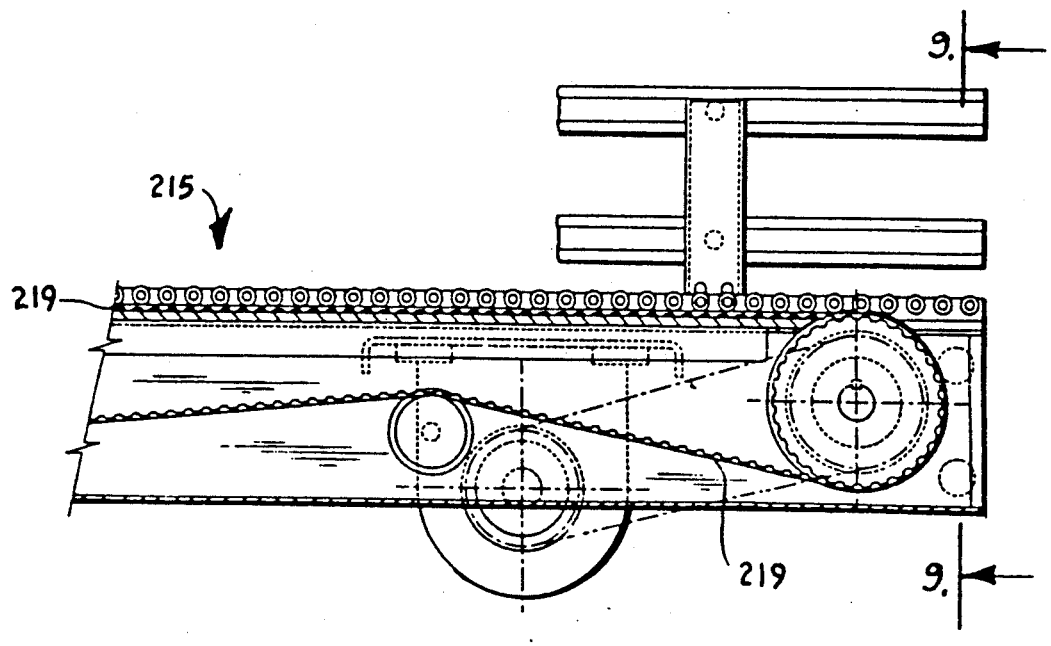
FIG. 8 is a fragmentary vertical sectional view of an alternative embodiment of the endless drive member.

As indicated in FIGS. 8 and 9, the present conveyor module, generally designated 215, may be provided with endless drive members 219 which are disposed laterally outwardly of the sidewalls 224, 225 and which are formed from relatively continuous flexible belts, rather than pivotally connected links. Typically, the belt-driven conveyor modules 215 are employed on relatively straight sections of the conveyor. Alternatively, a flexible, reinforced elastomeric cable (not shown) may be employed as the endless drive member.

Irrespective of the specific construction or location of the endless drive member 219, the bearing members 221 disposed between adjacent oversized transport sleeves 18, 218 are preferably the dual armed type shown in FIGS. 9-12. As indicated therein, the ends of the enlarged transport sleeves 218 are staggered on adjacent rollers. Each arm 250 of the bearing member 221 is formed with relatively enlarged, sleeve-receiving cradles 251 alternating between the smaller shaft-receiving openings 217. The staggered or interdigitated arrangement of the transport sleeves 218 interrupts the gap in the product conveying surface of these sleeves, thereby reducing the opportunity for the conveyed goods to become snagged between the oversized sleeves 218.

As indicated in FIGS. 11 and 12, clearance is provided between the roller shaft 17, 217 and the enlarged bearing openings 222, as well as between the cradles 251 and sleeves 18, 218. An accumulated load state (FIG. 12) exists when the concentration or accumulation of goods being conveyed is so great in a given area that some reduction in the horizonally-directed pressure of the accumulated mass needs to be provided in order to avoid container damage. Under an accumulated load, the roller shaft 17 deflects in the middle of the conveyor. If the load is sufficient, the roller shaft 17 will deflect to the point where the oversized sleeve 18 bottoms out in the bearing cradle 251, thereby creating drag on the sleeve. Depending upon the amount of pressure exerted by the load and the amount of drag created thereby, the sleeve 18 will either slow or cease rotating, thereby reducing or eliminating the thrust exerted on the items being conveyed. Preferably, the clearance between the cradle 251 and the sleeve 18 is less than the clearance between the enlarged opening 222 and the roller shaft 17. Accordingly, the sleeve tends to bottom out in the cradle before the shaft bottoms out in the bearing opening, so a gap tends to form between the outer wall of the roller shaft and inner wall of the oversized sleeve. This gap or reduced contact area, besides reducing wear, also reduces the amount of thrust transmitted to the product mass. As previously indicated, the spaces provided between the laterally outwardly disposed or outboard bearing openings 22 (FIG. 12) and the roller shafts disposed therein allow the traction rollers 20 to lift partially from full pressure contact with the drive belt 19 as the ends of the roller shaft deflect upwardly. This reduces the driving torque on the roller shaft, thereby contributing further to the reduction in driving force on the conveyed product, as well as reducing wear on the oversized transport sleeves 18 and bearing members 21.

The extent to which the above-described responses occur is controlled directly by the density of the conveyed product mass, and to that extent, the system is self regulating. Typically, in the accumulated load state, the inability of the products to move downstream and the attendant pressure of the oversized transport sleeves against the roller shafts causes the roller shafts and sleeves to seek a deflection in both horizontal and vertical planes with some resultant intermediate deflection occurring. By providing enlarged shaft-receiving openings 222 and sleeve-receiving cradles 251 in the bearings 221, limited horizontal deflection, as well as vertical deflection, is permitted. Since the clearance between sleeve and cradle is less than between shaft and opening, the sleeve engages the side wall of the cradle before the shaft engages the side wall of the opening. This differential tends to reduce the pressure between shaft and sleeve in the accumulated load state. In addition, the friction between the sleeve and the cradle wall tends to slow or stop the sleeve. Accordingly, the accumulation pressure is reduced when the shaft deflects horizontally or vertically.

Typically, the bearing members 21, 221 (FIG. 9) are sized and positioned so that, under normal load conditions, the roller shaft 17, 217 is not supported by said bearings. Rather, the weight of the load is carried by the laterally outwardly disposed traction sleeves 220 and drive members 219. However, particularly when the present conveyor module is adapted for transporting crates and other heavy objects, it is advisable either to provide bearings that support a substantial portion of the load or an additional endless drive member 219 near the center of the conveyor. If load-supporting bearings are employed, those bearings 21 disposed adjacent to the traction sleeve 220 are provided with bearing openings (not shown) positioned slightly downstream of the openings formed in the more inwardly disposed bearing members 221. Since the bearings, in this instance at least, support a portion of the load, the roller shaft 217 cannot move downwardly under accumulated load conditions. Hence, the pressure between the traction sleeve and drive member 219 remains relatively constant. Nevertheless, the shaft is still able to deflect in the horizontal plane, as space remains in the bearing openings 222 for such movement, and the forces which urge the shaft to deflect in this plane are still present.

The present conveyor may be adapted to a variety of configurations beyond those illustrated. For instance, if there is a need to expand an existing conveyor, the present conveyor may be designed as a relatively shallow deck which is mounted upon the old conveyor. In this instance, the traction sleeves of the present conveyor may be positioned on the roller shafts to engage the belt or other drive member of the old conveyor. It is also contemplated that the present conveyor may have one or more portions which are inclined and which act as a self regulating, powered gravity conveyor for controlling the movement of products on a declining conveyor run. In addition, the present conveyor may be provided with branches which divert the goods to multiple filling the packaging lines downstream without additional drives becoming required. The present conveyor may be very wide and provided with multiple independent parallel runs of individual product lanes. Due to its self regulating pressure control, the subject mini-roller conveyor requires few additional flow or accumulation pressure controls, if any, other than the addition of intermediate guide rails for laning. The present conveyor design is substantially free of dead plates and slides which are normally required for product transfer from module to module. It is also contemplated that openings may be provided in the center of the present roller deck whereby product may enter or exit.

While several embodiments of the present invention have been illustrated and/or described in some detail, the foregoing specification is not intended to limit or restrict the gist or spirit of the invention nor the scope of the following claims.

I claim:

1. In a conveyor module provided with a support structure, a plurality of elongated roller shafts extending laterally across the support structure in spaced apart, side-by-side relation to one another, and at least one oversized transport sleeve mounted on each of the roller shafts, that improvement which comprises:
   (a) at least one endless drive member movably mounted on the support structure below and in generally transverse relation to the roller shafts;
   (b) a traction sleeve disposed on each of the roller shafts for frictional engagement with the endless drive member; and
   (c) a plurality of bearing members mounted on the support structure, each of said bearing members being formed with at least one roller shaft-receiving opening, said opening being enlarged in at least one radially extending direction to permit a segment of the roller shaft rotatably housed therein to move off center.

2. The conveyor module according to claim 1, wherein each traction sleeve is formed from synthetic resin material and is provided with an inner diameter which is less than the outer diameter of the roller shaft upon which it is mounted.

3. The conveyor module according to claim 1, wherein each of the bearing members is a longitudinally extending strip of synthetic resin material and is formed with a plurality of roller shaft-receiving openings.

4. The conveyor module according to claim 1, wherein said bearing members are disposed in end to end fashion along substantially the entire length of the support structure and in laterally spaced apart fashion across the breadth of said support structure.

5. The conveyor module according to claim 1, wherein at least one of the bearing members is provided with relatively opposing first and second arms, each of said arms being formed with at least one transport sleeve-receiving cradle and at least one roller shaft-receiving opening.

6. The conveyor module according to claim 5, wherein the roller shaft-receiving opening on the first arm is aligned with the transport sleeve-receiving opening on the second arm.

7. The conveyor module according to claim 1, wherein an endless drive member is disposed adjacent to each of two laterally spaced apart sides of the support structure.

8. The conveyor module according to claim 7, wherein each of the endless drive members is formed from a plurality of generally flat, pivotally interconnected links.

9. The conveyor module according to claim 7, wherein each of the endless drive members is formed from a flexible belt.

10. The conveyor module according to claim 7, wherein the bearing members are mounted in laterally spaced apart fashion on the support structure to house the roller shaft segments disposed on opposite sides of each of the traction sleeves and the transport sleeve.

11. The conveyor module according to claim 1 wherein said roller shafts each have a pair of said traction sleeves spaced apart thereon and said support structure has a pair of said endless drive members spaced apart and mounted thereon adjacent each of two laterally spaced apart sides of the support structure, said pair of traction sleeves being in frictional engagement respectively with said pair of endless drive members.

12. In a conveyor module capable of operating under normal load and accumulated load conditions and provided with a support structure, a plurality of elongated roller shafts extending across the support structure in spaced apart side-by-side relation to one another, and at least one oversized transport sleeve mounted on each of the roller shafts:
   (a) said oversized transport sleeves being of sufficiently greater inside diameter with respect to said roller shafts to allow said roller shafts to rotate relatively freely within said sleeves,
   (b) at least one endless drive member movably mounted on the support structure;
   (c) a traction sleeve disposed on each of the roller shafts for direct surface contact with the endless drive member;
   (d) at least three bearing members for each roller shaft, said bearing members being mounted on the support structure, each of said bearing members being formed with at least one roller shaft-receiving opening, one of said bearing members being disposed at each end of said transport sleeve; and
   (e) said endless drive member, traction sleeve, bearing members, and roller shaft-receiving openings being sized and positioned so that the bearing members disposed at each end of the oversized transport sleeve carry a substantially greater portion of the load during the accumulated load condition than during the normal load condition.

13. The conveyor module according to claim 12, wherein the traction sleeve slips relative to the endless drive member more during the accumulated load condition than during the normal load condition.

14. In a conveyor module capable of operating under normal load and accumulated load conditions and provided with a support structure, a plurality of elongated roller shafts extending across the support structure in spaced apart side-by-side relation to one another, and at least one oversized transport sleeve mounted on each of the roller shafts, that improvement which comprises:
   (a) at least one endless drive member movably mounted on the support structure;
   (b) a traction sleeve disposed on each of the roller shafts for surface contact with the endless drive member;
   (c) a plurality of bearing members mounted on the support structure, each of said bearing members formed with at least one roller shaft-receiving opening; and
   (d) said endless drive member, traction sleeve, bearing members, and roller shaft-receiving opening being sized and positioned so that the bearing members carry a substantially greater portion of the load during the accumulated load condition than during the normal load condition;
   (e) the amount of surface contact between the traction sleeve and the endless drive member being less during accumulated load condition than during normal load condition.

15. In a conveyor module for transporting articles in a downstream direction under normal load and accumulated load conditions and provided with a support structure, a plurality of elongated roller shafts extending laterally across the support structure in spaced apart, side-by-side relation to one another and at least two oversized transport sleeves mounted on each of the roller shafts:

(a) said oversized transport sleeves being of sufficiently greater inside diameter with respect to said roller shafts to allow said roller shafts to rotate relatively freely within said sleeves, (b) at least one endless drive member movably mounted on the support structure below and in generally transverse relation to the roller shafts;

(c) a traction sleeve disposed on each of the roller shafts for frictional engagement with the endless drive member; and (d) at least three bearing members, each operatively connected to the support structure and formed with at least one roller shaft-receiving opening, two of said three bearing members being respectively positioned nearer to opposed ends of said roller shafts than the center thereof and the third of said bearing members being positioned between said two bearing members and between said two oversized transport sleeves.

* * * * *